3,314,940
POLYSACCHARIDE DERIVATIVES AND
PREPARATION THEREOF
José Thérèse Lemmerling, Edegem, and Johan Lodewijk Verelst, Antwerp, Belgium, assignors to Gevaert Photo-Producten N.V., Mortsel-Antwerp, Belgium, a Belgian company
No Drawing. Filed Oct. 1, 1962, Ser. No. 227,563
Claims priority, application Great Britain, Oct. 2, 1961, 35,570/61
5 Claims. (Cl. 260—215)

The present invention relates to sulfobenzoyl esters of polysaccharides (and of polysaccharide derivatives) and to their preparation.

It is known from the U.S. patent specification No. 2,241,235 to prepare certain sulfobenzoyl esters of cellulose by reacting upon cellulose with sulfobenzoic anhydride. According to this method only o-sulfobenzoyl esters can be prepared since m- and p-sulfobenzoic anhydrides are not known.

The present invention relates to a process for preparing a sulfobenzoyl ester of a polysaccharide or of a polysaccharide derivative having free hydroxyl groups which comprises reacting the said polysaccharide or derivative thereof with m- or p-halogenosulfonyl benzoic acid, the nucleus of which is unsubstituted or substituted with a group or groups which is (are) inert to the reactants and reaction products, the reaction being carried out in the presence of a tertiary organic base.

Due to the presence of the base, the meta- or parasulfobenzoyl ester produced according to the process is in the form of a salt of the tertiary organic base. The free ester can be obtained from the salt by well known methods.

The halogen of the halogenosulfonyl group is preferably chlorine.

The reaction can be carried out at room temperature and then lasts about 24 hours. A reaction temperature of about 60 to 80° C. is preferred, however and in this case a reaction time of 4 to 6 hours suffices. Evidently the degree of substitution attained will depend mainly upon the temperature of the reaction medium and upon the reaction time.

The following formula represents a reaction product which has been obtained by the reaction of a number, $n$, of hydroxyl groups of a polysaccharide molecule or a molecule of a polysaccharide derivative having free hydroxl groups with m- or p-halogenosulfonyl benzoic acid:

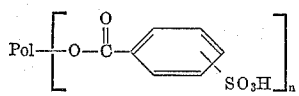

wherein Pol represents the molecule of a polysaccharide (or derivative thereof) less $n$ original free hydroxyl groups. The degree of substitution and therefore $n$ may of course be varied.

As will be mentioned in Example 1, it can easily be proved by infrared spectral analysis, by conductometric and by potentiometric titration, that, although it could be expected that p- or m-carboxyphenyl sulfonic acid esters of polysaccharides or of polysaccharide derivatives should be obtained, surprisingly sulfobenzoyl esters of the polysaccharides or of their derivatives are formed.

The reaction of the invention can be applied to all known polysaccharide compounds e.g. cellulose, starch, amylose, amylopectine, alginic acid or to their partially esterified and/or etherified derivatives still bearing free hydroxyl groups. Among the partially esterified and/or etherified polysaccharide compounds which can be used as starting materials for the preparation of sulfobenzoyl esters according to the invention may be mentioned: cellulose acetate, ethyl cellulose, benzyl cellulose, hydroxyethyl cellulose and corresponding derivatives of the other polysaccharides.

As examples of suitable halogeno-sulfonyl benzoic acids, p-chlorosulfonyl benzoic acid and m-chlorosulfonyl benzoic acid may be mentioned. Examples of inert groups with which the phenyl nucleus of the benzoic acid can be substituted are nitro groups, alkyl groups and halogen atoms.

The tertiary organic base in the presence of which the polysaccharide or a derivative thereof is reacted with the halogenosulfonyl benzoic acid is preferably anhydrous pyridine. Other particularly suitable tertiary bases are, e.g., dimethyl aniline, diethyl aniline, trimethylamine, and triphenylamine.

The free m- or p-sulfobenzoyl ester of a polysaccharide or of a derivative thereof can be obtained from the salt of the tertiary organic base, e.g., by pouring a solution of the salt into water which has been previously acidified e.g., with hydrochloric acid, whereby the required free sulfonic acid derivative precipitates.

In addition to an excellent solubility in organic solvents, e.g., in alcohol and acetone, the free sulfonic acid derivatives of the invention are mainly characterized by their solubility in alkaline solutions and by their insolubility in acids.

The free sulfonic acid derivatives are alkali-soluble at a temperature of about 0° C. when their degree of substitution of m- or p-sulfobenzoyl groups is at least 0.15 If a substitution degree of about 0.3 is attained, they are alkali-soluble at room temperature.

The alkali-solubility of the free sulfonic acid derivatives depends on their degree of substitution. The same solubility phenomena are observed in the case of the alkali- or ammonium salts of these sulfonic acids.

The m- and p-sulfobenzoyl esters of the present invention are new per se both in the free form and in a salt form, e.g. an alkali metal salt, an ammonium salt and a salt derived from a tertiary organic base. The salts derived from tertiary organic bases are very unstable.

In general, the esters can be used, either instead of or mixed with gelatin, as binding agents for light-sensitive silver salts in photographic materials. They can also be employed as binding agents for many kinds of photographic auxiliary layers, e.g. antihalation layers, antistress layers, antistatic layers, filter layers, etc.

The free m- and p-sulfobenzoyl esters may also be used as thickening agents. For instance, they can be added to a photographic coating solution. The thickening action of the compounds of the invention enables a much easier application and drying of the photographic coating solution.

Furthermore the free m- and p-sulfobenzoyl esters can be added to photographic layers thus conferring on these layers special properties, e.g. increase of the insolubility of photographic layers in acid media.

Although the alkali metal salts of free m- and p-sulfobenzoyl esters are soluble in cold water, they are insoluble in water at higher temperatures and this insolubility depends upon the degree of substitution of sulfobenzoyl groups and upon the concentration of their aqueous solutions.

In the case of ethyl cellulose-p-sulfobenzate having a degree of substitution of 0.3 p-sulfobenzoyl groups, a 2% aqueous solution does not gel at higher temperatures. A 3% aqueous solution, however, of the same ethyl cellulose-p-sulfobenzoate gels at 15° C. and higher, whereas a 4% aqueous solution gels even at 10° C. If, on the contrary, the degree of substitution of p-sulfobenzoyl groups is lower than 0.3, a 2% aqueous solution gels at 20° C. and higher whereas a 3% aqueous solution gels even at 10° C.

This water-insolubility at increased temperatures markedly facilitates the casting of layers starting from aqueous solutions of the alkali metal salts of free m- and p-sulfobenzoyl esters.

If a cold aqueous solution of the alkali metal salts of free m- and p-sulfobenzoyl esters is coated onto a support and a hot air current is led over the coated solution, this current causes an instant gelling of the m- and p-sulfobenzoyl esters. This rapid gelling is of very great importance e.g. in manufacturing photographic material. When a photographic emulsion does not gel rapidly enough or not at all, as is the case for a whole series of emulsions chiefly consisting of polymeric binding agents, there is the risk of the emulsion running on the support if it is in a vertical position during processing. Such an emulsion can only be coated by special coating machinery provided with a flat drying system. Because of the rapid gelling at increased temperatures of photographic emulsions essentially containing m- and p-sulfobenzoyl esters, the use of such special coating machines is not necessary. Moreover, whilst manufacturing photographic paper material, the foregoing rapid gelling involves either a very slight penetration or no penetration at all of the emulsion into the paper support. Thus it is no longer necessary to apply special protective layers onto the paper which serves as a support for the photographic emulsion.

A particular application of the m- and p-sulfobenzoyl esters results from the above mentioned properties viz. water-solubility and alkali-solubility of the alkali metal- or ammonium salts of the free esters. Hereby the sodium salts for example can be used as binding agents for light-sensitive emulsions coated onto a nuceli containing layer which is used for the application of the silver complex diffusion transfer process. Said nuclei-containing layer contains a water-insoluble reducing agent for silver salts. After image-wise exposure of the material and development in a bath which contains a solvent for the non-exposed silver halide, a positive silver image is formed in the nuclei-containing layer, also referred to as the image-receiving layer. Although they are alkali-soluble, the aforesaid sodium salts do not dissolve in the alkaline developing bath on account of its high salt content. Since, however, the sodium salts are water-soluble, the topmost light-sensitive silver halide layer formed from these sodium salts, after development, can easily be washed away with water whereby the positive silver image produced in the nuclei-containing layer appears.

Said insolubility in developing baths is very important when the alkali metal or ammonium salts of the free esters are used as binding agents for antihalation, antistress or antistatic layers which are usually soluble in the developing baths. Consequently, these layers only dissolve after the development step, when they are rinsed with water, whereby an early contamination of the developing bath is prevented.

As already mentioned hereinbefore, the m- and p-sulfobenzoyl esters of a polysaccharide and of a polysaccharide derivative according to the invention, are insoluble in acids, which facilitates markedly the application of layers starting from solutions of these derivatives. For instance, if the m- and p-sulfobenzoyl esters are coated as a protective layer onto a surface which was previously acidified, this acid causes an accelerated setting of the m- or p-sulfobenzoyl esters, whereby the subsequent drying of the layer is considerably accelerated.

The preparation and the application of determined m- or p-sulfobenzoyl esters according to the invention are illustrated hereinafter by the following examples.

*Example 1.—Ethyl cellulose p-sulfobenzoate*

Into a three-necked 2 l. flask is brought 1 l. of anhydrous pyridine wherein are dissolved 50 g. of ethyl cellulose having a hydroxyl content of 47.5–49% (which corresponds to an average degree of substitution of 2.45 of ethoxyl groups per anhydroglucose unit) and a 5% solution of which in a mixture of toluene/ethanol (80 : 20) at 25° C. possesses a viscosity of 6–8 cps.

After addition of 60 g. of p-chlorosulfonyl benzoic acid acid the mixture is reacted at 100° C. for 1 h. and thereafter at 80° C. for 5 h.

The reaction mass is poured out into water which was previously acidified with hydrochloric acid. The formed precipitate is redissolved in ethanol and the obtained solution is poured out again into water. The product precipitates and is then washed with water until acid-free.

The infrared spectrum of the obtained cellulose derivative proves the presence in the polymeric chain of structural units corresponding to the following structural formula:

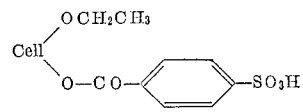

Typical bands for the aromatic ester function are found at $5.78\mu$–$7.90\mu$ and typical bands for the $SO_3H$-function are found at $8.58\mu$–$9.98\mu$.

A quantitative analysis of the obtained product is realized as follows: 307 mg. of the reaction product are dissolved in 100 cm.³ of a mixture of acetone and water (75 : 25) and titrated with a N/10 sodium hydroxide solution. The end point is found after adding 3.45 cm.³ of N/10 sodium hydroxide, which corresponds to 20.6% of

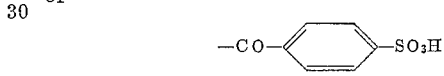

groups. From this value a degree of substitution of 0.326 sulfobenzoyl groups is calculated.

The obtained product is water-soluble at pH 7.

*Example 2.—Benzyl cellulose-p-sulfobenzoate*

In a three-necked flask 25 g. of benzyl cellulose, having a degree of substitution of 2.2 benzyl groups per anhydroglucose unit are dissolved in 500 cm.³ of anhydrous distilled pyridine and 70 g. of p-chlorosulfonyl benzoic acid are then added. After a reaction for 1 h. at 100° C. and for 4½ h. at 85° C. the reaction mass is poured out into acidified water.

The precipitate formed is dissolved in ethanol and this solution was poured out into water whereafter the obtained precipitate is washed with water until acid-free. The obtained benzyl cellulose-p-sulfobenzoate has a degree of a substitution of 0.17 p-sulfobenzoyl groups. The product is soluble in ice-water at pH 7.

*Example 3.—Cellulose-acetate-p-sulfobenzoate*

20 g. of a cellulose acetate having an acetic acid content of 43%, which corresponds to a degree of substitution of 1.65–1.7 of acetyl groups, dissolved in anhydrous pyridine, are reacted for 24 h. at 80° C. with 30 g. of p-chlorosulfonyl benzoic acid. The reaction mass is then poured out into water which has previously been acidified with hydrochloric acid. The formed precipitate is redissolved in ethanol, and the solution obtained is poured out into water whereafter the precipitate is washed with water until acid-free. The degree of substitution of p-sulfobenzoyl groups is 0.15.

The cellulose acetate-p-sulfobenzoate prepared according to the reaction is soluble in ethyl alcohol.

*Example 4.—Hydroxyethyl cellulose-p-sulfobenzoate*

50 g. of a hydroxyethyl cellulose having a degree of substitution of hydroxyethyl ether groups of 0.85 and a 2% aqueous solution of which has a viscosity of 75–116 cps. at 25° C., are added to 1 l. of anhydrous pyridine.

Next, 50 g. of p-chlorosulfonyl benzoic acid are added and the mixture is reacted for 24 h. at 80° C. The reaction mass is then poured out into water which has previously been acidified with hydrochloric acid whereafter the formed precipitate is redissolved in ethanol. This solution is poured out into water and the resulted precipitate is washed with water until acid-free. The hydroxyethyl cellulose-p-sulfobenzoate thus prepared is a water-soluble product having a degree of substitution of 0.22 sulfobenzoyl groups.

*Example 5.—Ethylcellulose-m-sulfobenzoate*

25 g. of ethyl cellulose of Example 1 are dissolved in 500 cm.³ of anhydrous pyridine in a three-necked 1 l. flask at 100° C.

Next, 40 g. of m-chlorosulfonyl benzoic acid are added and the reaction mixture is maintained at 95° C. for 7 h. The formed viscous solution is poured out into water which has previously been acidified with hydrochloric acid. The formed precipitate is redissolved in ethanol. This solution is poured into water. The ethyl cellulose-m-sulfobenzoate is washed with water until acid-free. The degree of substitution amounts to 0.14 of m-sulfobenzoyl groups. The obtained product is soluble in acetone, ethanol and dioxane.

*Example 6.—Ethylcellulose-3,5-disulfobenzoate*

In a three-necked flask of 1 l. 50 g. of ethyl cellulose having an ethoxyl content of 44.5–45.5% which corresponds to an average degree of substitution of 2.25, are dissolved in a mixture consisting of 500 cm.³ of anhydrous dioxan and 200 cm.³ of anhydrous pyridine.

When the ethyl cellulose is completely dissolved 16 cm.³ of chemically pure hydrochloric acid and 56 g. of the sodium salt of 3,5-dichlorosulfonyl benzoic acid are successively added. At 90° C. the reaction lasts 25 h.

The reaction mass is poured out into distilled water. The formed precipitate is washed five times with distilled water. The substitution degree amounts to 0.25 of sulfobenzoyl groups.

*Example 7.—Alginic acid-p-sulfobenzoate*

In a three-necked flask of 2 l. 50 g. of sodium alginate are added to 1 l. of anhydrous pyridine. A 1% aqueous solution of this sodium alignate at 25° C. possesses a viscosity of 20–30 cps.

After adding 60 g. of p-chlorosulfonyl benzoic acid the reaction mass is stirred for 7 h. at 100° C. The reaction mass is poured out into ethanol which has previously been acidified with hydrochloric acid. The thus obtained precipitate is washed twice with ethanol and then dried in an air current at 60° C. The product has a substitution degree of 0.21 of p-sulfobenzoyl groups.

*Example 8.—Starch-p-sulfobenzoate*

204 g. of p-chlorosulfonyl benzoic acid, 700 cm.³ of pyridine and 100 g. of rice starch are successively brought in a three-necked flask of 2 l. The mass is stirred for 7 h. at 100° C. The reaction mass is poured out into ethanol which has previously been acidified with hydrochloric acid. The supernatant liquid is decanted. The obtained product is washed with ethanol until acid-free and pyridine-free. Finally the product is dried in an air current at 60° C. The product has a substitution degree of 0.25 of p-sulfobenzoyl groups. The obtained starch-p-sulfobenzoate is soluble in water at pH 7.

*Example 9.—Amylose-m-sulfobenzoate*

1 l. of anhydrous pyridine, 60 g. of m-chlorosulfonyl benzoic acid and 50 g. of amylose are brought in a three-necked flask of 2 l. The mass is stirred for 24 h. at 100° C. The reaction mass is poured out into ethanol which has previously been acidified with hydrochloric acid. The supernatant liquid is decanted. The obtained product is washed with ethanol until the product is acid-free and pyridine-free. Finally the product is dried in an air current at 60° C. The obtained amylose-m-sulfobenzoate has a substitution degree of 0.2 of m-sulfobenzoyl groups.

*Example 10.—Amylopectine acetate-p-sulfobenzoate*

In a three-necked flask of 2 l., 50 g. of amylopectine acetate are added to 1 l. of anhydrous pyridine. The amylopectine acetate has a substitution degree of 1.5 of acetyl groups. When all is dissolved, 60 g. of p-chlorosulfonyl benzoic acid are added. The mass is stirred for 7 h. at 100° C.

The reaction mass is poured out into ethanol which has previously been acidified with hydrochloric acid. The supernatant liquid is decanted. The obtained product is washed with ethanol until it is acid-free and pyridine-free. Finally it is dried in an air current at 60° C. The product has a substitution degree of 0.24 of p-sulfobenzoyl groups.

The following examples illustrate the photographic applications of the m- and p-sulfobenzoyl esters according to the present invention.

*Example 11.—Photographic reversal material*

Onto 60 g./sq. m. transparent paper support impregnated with waxes or paraffines or the like are coated 47.7 g./sq. m. of a nuclei containing layer from the following composition:

| | |
|---|---:|
| Water _____ml__ | 5500 |
| Gelatin _____g__ | 400 |
| Colloidal silver sulfide _____g__ | 1.0 |
| Sodium alginate _____g__ | 80 |
| 20% formaldehyde _____ml__ | 20 |

After drying the above layer 20 g./sq. m. of a mixture of the following composition is applied as an interlayer upon this nuclei containing layer:

| | |
|---|---:|
| Solvitose H4 _____g__ | 400 |
| Water _____ml__ | 8600 |
| Leophen BN conc. _____ml__ | 50 |

Solvitose H4 is the registered trademark of N.V. Scholten's Chemische Fabrieken, Groningen, for a hydroxyethyl starch. Leophen BN conc. is a registered trademark of Badische Anilin- & Soda-Fabrik A.G., Ludwigshafen (Rhine), for a sulfonate of the following composition:

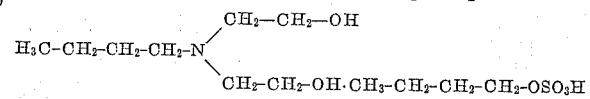

For the preparation of the light-sensitive emulsion, a washed AgBr.AgI-emulsion containing 1.5 mol percent of AgI and having a high contrast value is used as starting product. To 200 g. of this emulsion which contains about 1 mol of silver halide and 120 g. of gelatin per kg. of emulsion and the pH of which amounts to 7.6, the following products are added: 7.5 cm.³ of a solution containing as a sensitizer 1 g. of {2-[3-(ω-acetyl-sulfonamido propyl)-6-methyl benzothiazole]}-[2-(3-ethyl selenazoline)] trimethine cyanine iodide (see Example 20 of British patent specification No. 904,332) in 1 l. of ethanol, further also 15 cm.³ of a 0.1% solution in ethanol of 1-phenyl-5-mercapto-1,2,3,4-tetrazole and 6 cm.³ of a 12.5% saponine solution.

To 90 g. of the thus obtained homogeneous mixture are added at 25° C. whilst thoroughly stirring 640 cm.³ of a 2% aqueous solution of the sodium salt of ethyl cellulose-p-sulfobenzoate with a degree of substitution of 0.326 of p-sulfonbenzoyl groups (see Example 1).

Starting from the obtained light-sensitive emulsion a layer of 2.1 g. AgNO₃/sq. m. is coated onto the above intermediate layer of hydroxyethyl starch. After exposure this direct positive material is developed for 1 min. at 20° C. in a developing bath of the following composition:

| | G. |
|---|---:|
| Hydroquinone _____ | 10 |
| Sodium sulfite _____ | 60 |
| 1-phenyl-3-pyrazolidone _____ | 0.5 |
| Potassium bromide _____ | 2 |
| Sodium phosphate _____ | 80 |
| Sodium thiosulfate·5H₂O _____ | 10 |
| Water to 1000 ml. | |

Due to the water-solubility of the ethyl cellulose-p-sulfobenzoate, the emulsion layer is already completely washed away after 15 sec. rinsing with cold water. A positive image transferred by diffusion is left in the nuceli containing layer.

In this example when preparing the light-sensitive emulsion with ethyl cellulose-p-sulfobenzoate as a binding agent, the mixture of the p-sulfobenzoyl esters and of the light-sensitive emulsion, can also be carried out in the three following ways:

(A) To 90 g. of the homogeneous mixture of Example 11 is added at 30° C. whilst thoroughly stirring 420 cm.³ of a 3% aqueous solution of ethyl cellulose-p-sulfonbenzoate of Example 1 and 50 cm.³ of ethanol.

(B) The same procedure as in A is followed but instead of 50 cm.³ of ethanol, 25 cm.³ of a 2% aqueous sodium salicylate solution are first added to 90 g. of the homogeneous mixture.

(C) To 90 g. of the homogeneous mixture are added at 30° C. whilst thoroughly stirring 320 cm.³ of a solution which contains 4 g. of ethyl cellulose-p-sulfobenzoate per 100 cm.³ of a mixture of 40 cm.³ of water and of 60 cm.³ of ethanol.

*Example 12*

The following products are mixed:

| | |
|---|---|
| Water ml | 7200 |
| Gelatin g | 200 |
| Sodium alginate g | 40 |
| 1-phenyl-5-mercapto-1,2,3,4-tetrazole g | 3 |
| Colloidal nickel sulfide g | 0.25 |
| 20% formaldehyde ml | 20 |
| Hostapon T (5% aqueous solution) ml | 30 |

Hostapon T is a registered trademark of Farbwerke Hoechst A.G., Frankfurt am Main, for the sodium salt of the condensation product of oleic acid with methyl taurine, corresponding to the formula:

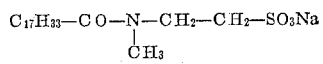

After subsequently mixing the aforesaid ingredients 5 l. of water are added. 40 g./sq. m. of this mixture are applied as a nuclei containing layer to a slightly baryta-coated paper of 90 g./sq. m. Next, onto this nuceli containing layer 23.8 g./sq. m. of an intermediate layer are applied from the following composition:

| | |
|---|---|
| Sodium salt of ethyl cellulose-p-sulfobenzoate (see Example 1) g | 100 |
| Water to 5000 ml. | |
| Aerosol OT (5% aqueous solution) ml | 60 |

Aerosol OT is the registered trademark of American Cyanamid Co., New York, for a sodium salt of di-octyl-sulfo succinic acid.

The light-sensitive emulsion is prepared as follows. To 200 g. of a washed high contrasty silver chloride emulsion containing per liter 0.27 mol of silver halide and 50 g. of gelatin, are added at a pH of 6.6, 5 cm.³ of a solution which contains as a sensitizer {2-[3-(ω-acetyl-sulfonamido-propyl) - 6 - methyl-benzothiazole]}-[2-(3-ethyl selenazoline)]-trimethine cyanine iodide (see Example 20 of the British patent specification 904,332) in 1 l. of ethanol and 6 cm.³ of a 12.5% saponine solution.

To 90 g. of this homogeneous mixture are added 320 cm.³ of a 4% solution of ethyl cellulose p-sulfobenzoate (see Example 1) in a mixture of ethanol and water (60:40).

From this light-sensitive emulsion is coated a light-sensitive layer onto the above intermediate layer in such a way that the silver content of the light-sensitive layer obtained corresponds to 1.7 g. AgNO₃/sq. m.

After exposing, this direct positive photographic material is developed for 1 min. in a developing bath of the following composition:

| | G. |
|---|---|
| Hydroquinone | 10 |
| Sodium sulfite | 60 |
| 1-phenyl-3-pyrazolidone | 0.5 |
| Potassium bromide | 2 |
| Sodium phosphate | 80 |
| Sodium thiosulfate·5H₂O | 5 |
| Water to 1000 ml. | |

After development this material is rinsed in water. Already after rinsing for about 15 sec. both the emulsion layer and the intermediate layer are fully washed away. By diffusion-transfer a positive image was formed in the nuceli-containing layer.

We claim:

1. A process for preparing a sulfobenzoyl ester of a polysaccharide compound having free hydroxyl groups which comprises reacting at a temperature between about room temperature and about 100° C. said polysaccharide compound with a member selected from the group consisting of m-halogenosulfonylbenzoic acid and p-halogenosulfonyl benzoic acid in the presence of an organic base.

2. A process for preparing the sulfobenzoyl ester of ethyl cellulose having free hydroxyl groups which comprises reacting at a temperature between about room temperature and about 100° C. ethyl cellulose with a member selected from the group consisting of m-chlorosulfonyl benzoic acid and p-chlorosulfonyl benzoic acid in the presence of anhydrous pyridine.

3. A process for preparing the sulfobenzoyl ester of cellulose acetate having free hydroxyl groups which comprises reacting at a temperature between about room temperature and about 100° C. cellulose acetate with a member selected from the group consisting of m-chlorosulfonyl benzoic acid and p-chlorosulfonyl benzoic acid in the presence of anhydrous pyridine.

4. A process for preparing the sulfobenzoyl ester of hydroxyethyl cellulose having free hydroxyl groups which comprises reacting at a temperature between about room temperature and about 100° C. hydroxyethyl cellulose with a member selected from the group consisting of m-chlorosulfonyl benzoic acid and p-chlorosulfonyl benzoic acid in the presence of anhydrous pyridine.

5. A process as in claim 1 wherein the result of said reaction is the organic base salt of said ester and the free ester is obtained by introducing said salt into acidified water.

References Cited by the Examiner

UNITED STATES PATENTS

| 2,241,235 | 5/1941 | Bachman | 260—225 |
| 2,834,776 | 5/1958 | Malm | 260—225 |
| 3,137,575 | 6/1964 | Chambers | 96—94 |
| 3,152,906 | 10/1964 | Overman | 96—94 |

LEON J. BERCOVITZ, *Primary Examiner.*

WILLIAM H. SHORT, R. W. MULCAHY,
*Assistant Examiners,*